United States Patent [19]
Kosaka et al.

[11] 3,937,010
[45] Feb. 10, 1976

[54] FUEL OXIDIZER

[75] Inventors: Katuaki Kosaka, Tokyo; Zene Ueno, Fuchu; Tadahiko Nagaoka, Tokorozawa, all of Japan

[73] Assignee: Nissan Motor Co., Ltd., Yokohama, Japan

[22] Filed: Oct. 25, 1973

[21] Appl. No.: 409,678

[30] Foreign Application Priority Data
Nov. 27, 1972   Japan............................ 47-11873

[52] U.S. Cl............ 60/39.46 R; 23/288 E; 423/219
[51] Int. Cl.²............................................ F02C 3/20
[58] Field of Search......... 60/39.46, 39.51 H, 39.12, 60/39.02, 28 G; 23/288 E; 48/210; 423/219, 239

[56] References Cited
UNITED STATES PATENTS

| | | |
|---|---|---|
| 2,337,956 | 12/1943 | Yerrick et al...................... 23/288 E |
| 2,490,986 | 12/1949 | Symonds............................ 423/219 |
| 2,642,340 | 6/1953 | Martin................................ 423/219 |
| 3,246,961 | 4/1966 | Karlsson............................ 23/288 E |
| 3,273,971 | 9/1966 | Baddorf et al..................... 60/286 |
| 3,361,531 | 1/1968 | Erb et al............................ 423/219 |
| 3,641,763 | 2/1972 | Cole................................... 60/39.51 H |
| 3,770,399 | 11/1973 | Chong................................ 48/210 |

*Primary Examiner*—C. J. Husar
*Assistant Examiner*—Robert E. Garrett

[57] ABSTRACT

A rotating wheel made of oxygen absorbing material absorbs oxygen from air passing therethrough from an air inlet to a residual gas outlet. Fuel passing through the wheel from a fuel inlet to an oxidized gas outlet is oxidized by the absorbed oxygen.

14 Claims, 1 Drawing Figure

U.S. Patent   Feb. 10, 1976   3,937,010
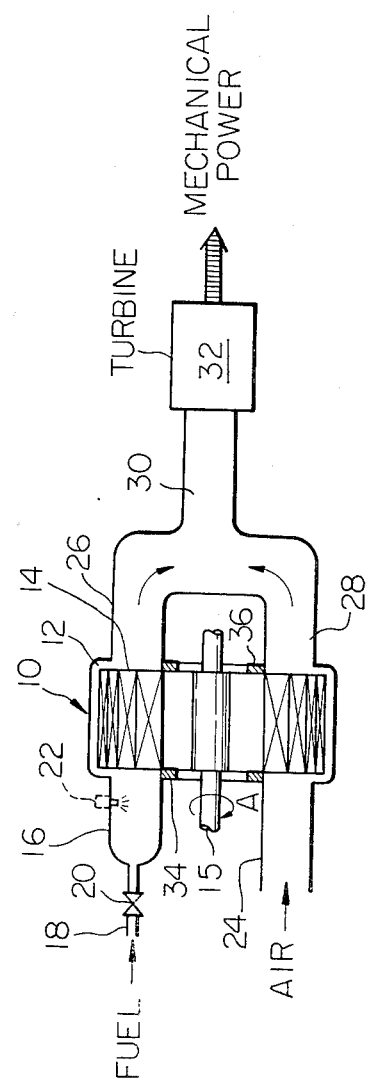

FUEL OXIDIZER

The present invention relates to a fuel oxidizer, and more particularly to a fuel oxidizer preventing formation of nitrogen oxides during fuel oxidation.

In a conventional fuel oxidizer, it has been a common practice to mix fuel with air to form an air-fuel mixture which is fired by a suitable igniter. During combustion of the air-fuel mixture, a reaction will take place between nitrogen and oxygen contained in the air thereby producing nitrogen oxides which are emitted to the atmosphere and cause air pollution. Formation of nitrogen oxides can not be prevented as long as atmospheric air is used as an oxygen source for burning fuel. However, it is impractical in usual fuel oxidizers to use pure oxygen as an oxygen source as in a rocket engine, because of high cost and complexity in construction. Accordingly, a fuel oxidizer using oxygen extracted from atmospheric air is now necessarily required in the world.

An object of this invention is therefore to provide an improved fuel oxidizer for preventing formation of noxious nitrogen oxides during fuel oxidation.

Another object of this invention is to provide a fuel oxidizer which uses pure oxygen extracted from atmospheric air to prevent formation of noxious nitrogen oxides.

A further object of this invention is to provide a fuel oxidizer for use with a prime mover such as a gas turbine engine.

A still further object of this invention is to provide a fuel oxidizer which is simple and economical to manufacture.

It is well known that metals such as Fe, Ni, Cu, and V have a property to be alternately oxidized and reduced in dependence on the temperature of the atmosphere and the pressure of oxygen surrounding the metals. Reduced metals are oxidized by contact with an oxygen source such as air, while oxidized metals are reduced by contact with a material which requires oxygen for burning. In other words, the metals act as oxygen carriers which alternately attract and release oxygen. It is an important feature of this invention that fuel is burned with oxygen carried by a metal of the above-mentioned type.

These and other objects, features and advantages of the present invention will become more apparent from the following description when taken in conjunction with the accompanying drawing, in which a single Figure shows a preferred embodiment of a fuel oxidizer according to the present invention.

In the drawing, there is schematically shown a preferred embodiment of a fuel oxidizer according to the present invention. In the illustrated embodiment, the fuel oxidizer is shown as being combined with a gas turbine engine by way of example only, and may be utilized with other devices. As shown, the fuel oxidizer comprises a housing 10 in which a chamber 12 is formed. A porous wheel 14 is rotatably disposed in the chamber 12 and driven by a suitable prime mover, though not shown, through a shaft 15 in the direction of an arrow A. The porous wheel 14 is made of an oxygen absorbing material such as a metal, which has the property of being alternately oxidized and reduced in dependence on certain factors. It should be appreciated that metals such as Fe, Ni, Cu, and/or V can be utilized as oxygen absorbing materials for the porous wheel 14.

The porous wheel 14 may be rotated at a constant speed within the chamber 12 by the prime mover (not shown) or may be rotated at varying speed to meet the intended purpose.

The housing 10 has a fuel inlet 16 which opens into the chamber 12 adjacent to an end face of the porous wheel 14. This fuel inlet 16 is connected through a pipe 18 with a source of fuel (not shown). The pipe 18 is shown as having a flow control valve 20 to meter fuel passing through the fuel inlet 16. The fuel inlet 16 may be provided with a suitable igniter 22 at a desired position and serve as a pre-combustion chamber. The igniter 22 may be of any suitable type insofar as it functions to ignite fuel in the fuel inlet 16.

The housing 10 also has an air inlet 24 which opens into the chamber 12 adjacent to the end face of the porous wheel 14 for introducing air into the chamber 12. This air inlet 24 is connected to a source of air (not shown) so that air under pressure is supplied through the air inlet 24. It should be noted that the air inlet 24 is spaced apart from the fuel inlet 16, but the central axis of the air inlet 24 is equidistant from that of the fuel inlet 16.

As shown in the drawing, an oxidized gas outlet 26 is formed in the housing 10 and opens into the chamber 12 adjacent to an opposite end face of the porous wheel 14. The oxidized gas outlet 26 is substantially axially aligned with the fuel inlet 16. The housing 10 is also formed with a residual gas outlet 28 which opens into the chamber 12 adjacent to the opposite end face of the porous wheel 14. The residual gas outlet 28 is substantially axially aligned with the air inlet 24. As shown, the residual gas outlet 28 is interconnected with the oxidized gas outlet 26 so that residual gas from the residual gas outlet 28 is mixed with oxidized gas from the oxidized gas outlet 26 to produce high-temperature gases. The high-temperature gases are then fed through a conduit 30 to a turbine 32 of the gas turbine engine and utilized thereby to produce mechanical power.

Indicated as 34 and 36 are annular seals disposed between end walls of the chamber 12 and adjacent end faces of the porous wheel 14, respectively, to provide a sealing function.

In operation, fuel is admitted through the pipe 18 to the fuel inlet 16 from the source of fuel (not shown). The amount of fuel flow is regulated by the flow control valve 20. The fuel is fired by the igniter 22 so that it is partly oxidized prior to complete combustion. The partly oxidized fuel is fed into the porous wheel 14, and is completely oxidized during contact with the metal oxide $FeO$, $NiO$, $CuO$, and/or $VO_2$ contained in the porous wheel 14. In this step, the combustible fuel reacts with the oxygen of the metal oxide to reduce it to its metallic component Fe, Ni, Cu, and/or V. Combustion products from this step are fed through the oxidized gas outlet 26. Next, the portion of the wheel 14 in which the reduction reaction has occurred moves to a location between the air inlet 24 and the residual gas outlet 28 by rotation of the wheel 14. Since air is continuously flowing through the air inlet 24 and a path in the chamber 12 formed between the inlet 24 and the outlet 28 to the outlet 28, the porous wheel 14 absorbs oxygen by reaction with the reduced metal Fe, Ni, Cu, and/or V reduced in the aforementioned step to produce the metal oxide $FeO$, $NiO$, $CuO$, and/or $VO_2$. After the oxygen in the air is extracted to combine with the reduced metal, the residual gas of which the principal ingredient is nitrogen is released through the residual gas outlet 28 to the conduit 30. The oxidized metal in this step is reduced again by oxidizing the fuel during the rotation of the wheel 14. Thus, the metal in the porous wheel 14 is alternately oxidized and reduced. Residual gas flowing through the residual gas outlet 28 and oxidized gas flowing through the oxidized gas outlet 26 are mixed to produce high-temperature gases which are fed through the conduit 30 to the turbine 32 to produce power.

Nitrogen oxides are therefore not formed and emitted to the atmosphere because fuel is efficiently oxidized by the oxygen extracted from the air by the wheel 14.

As many apparently widely different embodiments of this invention may be made without departing from the scope thereof, it is to be understood that the invention is not limited to the specific embodiments thereof except as defined in the appended claims.

What is claimed is:

1. A fuel oxidizer comprising a housing defining therein a chamber; an oxygen absorbable porous wheel rotatable within said chamber, said wheel being made of an oxygen absorbable material which alternately absorbs and releases oxygen in dependence on certain factors; a fuel inlet opening into said chamber adjacent to an end face of said wheel; an air inlet opening into said chamber adjacent to said end face of said wheel, said air inlet being spaced apart from said fuel inlet; an oxidized gas outlet opening into said chamber adjacent to an opposite end face of said wheel, said oxidized gas outlet being substantially axially aligned with said fuel inlet, said oxidized gas outlet feeding into means which produce mechanical power by being supplied with oxidized gas from said oxidized gas outlet; a residual gas outlet opening into said chamber adjacent to said opposite end face of said wheel, said residual gas outlet being substantially axially aligned with said air inlet; said wheel being operative to absorb oxygen, in a portion thereof which lies between said air inlet and said residual gas outlet opening, from air introduced into said chamber through said air inlet and allow residual gas to pass out of said chamber through said residual gas outlet; and said wheel being operable to allow fuel introduced into said chamber through said fuel inlet to be oxidized by said absorbed oxygen therewithin when said portion of said wheel is rotated to a position between said fuel inlet and said oxidized gas outlet opening and allow said oxidized fuel to pass out of said chamber through said oxidized gas outlet.

2. A fuel oxidizer as claimed in claim, 1 further comprising an igniter located in said fuel inlet for igniting said fuel, and wherein said fuel inlet serves as a pre-combustion chamber.

3. A fuel oxidizer as claimed in claim 1, in which said residual gas outlet is in communication with said oxidized gas outlet.

4. A fuel oxidizer as claimed in claim 1, in which the central axis of said fuel inlet and said air inlet are radially equidistant from a central axis of said housing.

5. A fuel oxidizer as claimed in claim 3, in which said outlets feed into said means which produce mechanical power.

6. A fuel oxidizer as claimed in claim 5, in which said means includes a turbine.

7. A fuel oxidizer as claimed in claim 1, in which said means includes a turbine.

8. A mechanical power producing system comprising in combination: a fuel oxidizer including a housing defining therein a chamber, an oxygen absorbable porous wheel rotatable within said chamber, said wheel being made of an oxygen absorbable material which alternately absorbs and releases oxygen in dependence on certain factors, a fuel inlet opening into said chamber adjacent to an end face of said wheel, an air inlet opening into said chamber adjacent to said end face of said wheel, said air inlet being spaced apart from said fuel inlet, an oxidized gas outlet opening into said chamber adjacent to an opposite end face said wheel, said oxidized gas outlet being substantially axially aligned with said fuel inlet, a residual gas outlet opening into said chamber adjacent to said opposite end face of said wheel, said residual gas outlet being substantially axially aligned with said air inlet, said wheel being operative to absorb oxygen, in a portion thereof which lies between said air inlet and said residual gas outlet opening, from air introduced into said chamber through said air inlet and allow residual gas to pass out of said chamber through said residual gas outlet, and said wheel being operable to allow fuel introduced into said chamber through said fuel inlet to be oxidized by said absorbed oxygen therewithin when said portion of said wheel is rotated to a position between said fuel inlet and said oxidized gas outlet opening and allow said oxidized fuel to pass out of said chamber through said oxidized gas outlet; and means which produce mechanical power by being supplied with oxidized gas from said oxidized gas outlet, said means being connected through said oxidized gas outlet to said oxidizer.

9. A mechanical power producing system as claimed in claim 8, in which said fuel oxidizer further includes an igniter located in said fuel inlet for ignition said fuel, and wherein said fuel inlet serves as a pre-combustion chamber.

10. A mechanical power producing system as claimed in claim 9, in which said residual gas outlet is in communication with said oxidized gas outlet.

11. A mechanical power producing system as claimed in claim 8, in which the central axis of said fuel inlet and said air inlet are radially equidistant from a central axis of said housing.

12. A mechanical power producing system as claimed in claim 10, in which said outlets feed into said means which producing mechanical power.

13. A mechanical power producing system as claimed in claim 8, in which said means includes a turbine.

14. A mechanical power producing system as claimed in claim 12, in which said means includes a turbine.

* * * * *